Oct. 17, 1944.  C. BREER ET AL  2,360,469
MOTOR VEHICLE LIGHTING
Filed Oct. 10, 1941   2 Sheets-Sheet 2

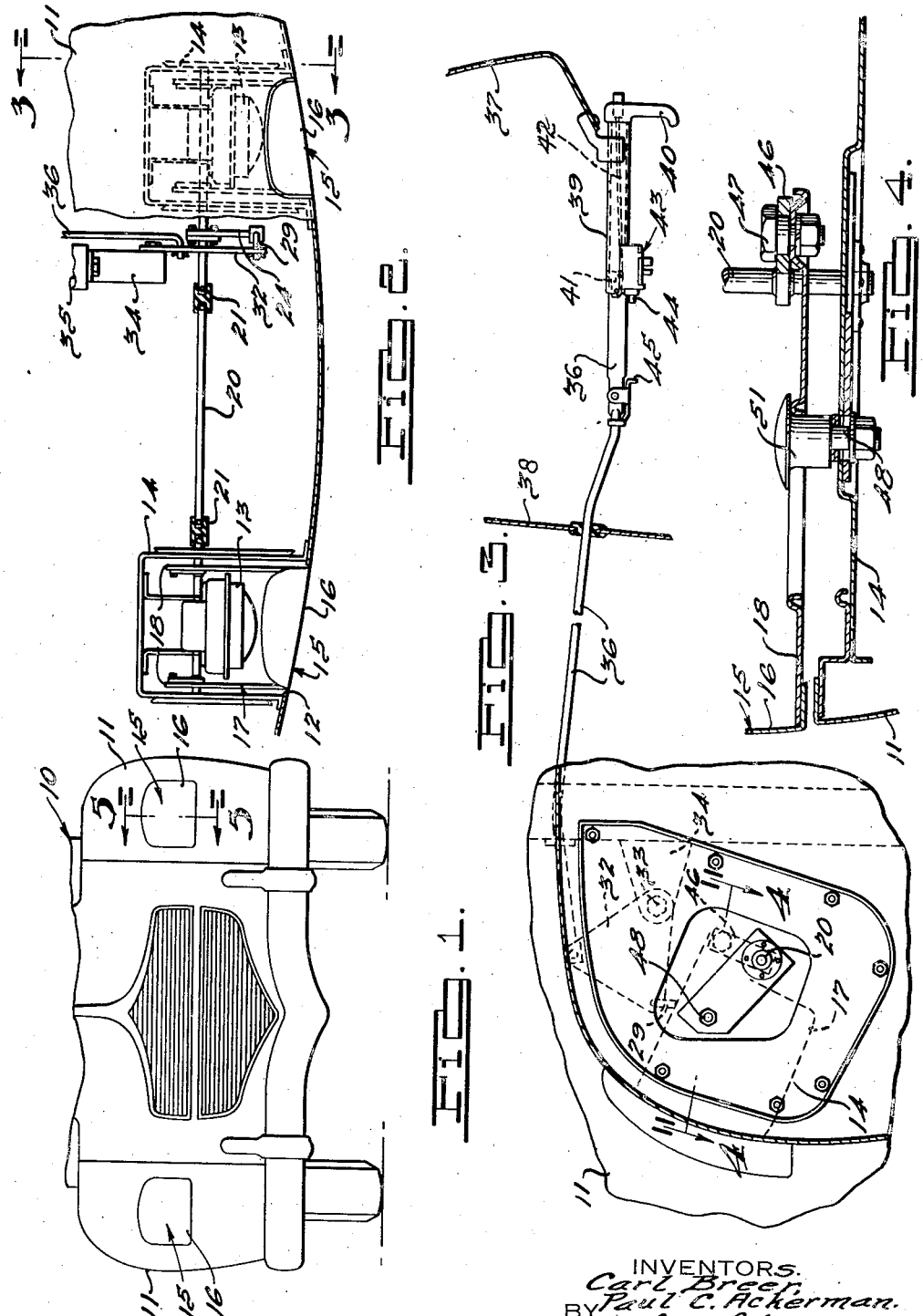

INVENTORS.
Carl Breer,
Paul C. Ackerman.
BY Harness, Dickey, Pierce & Harris
ATTORNEYS.

Patented Oct. 17, 1944

2,360,469

UNITED STATES PATENT OFFICE 2,360,469

MOTOR VEHICLE LIGHTING

Carl Breer and Paul C. Ackerman, Grosse Pointe, Mich., assignors to Chrysler Corporation, Highland Park, Mich., a corporation of Delaware Application October 10, 1941, Serial No. 414,428

7 Claims. (Cl. 240—7.1)

This invention relates to motor vehicles and more particularly to the disposition of a lamp with respect thereto.

An object of the invention is to provide a motor vehicle in which a portion thereof is provided with an opening behind which is disposed a lamp and to provide a closure for the opening movable to mask and unmask the lamp with respect to the opening, the closure when in masking position substantially completing the surface of the vehicle portion. Preferably, the closure is arranged for swinging movement relative to its associated lamp in a manner simulating opening and closing movement of the eyelid with respect to the human eye.

Another object of the invention is the provision of improved means for movingly supporting a closure of the foregoing type and for controlling operation of the lamp in timed relation with movement of the closure.

In an arrangement of the foregoing type it has been found desirable on moving the closure from its masking position to initially impart thereto movement which will break a seal formed, for example by ice, between the closure and the adjacent surface of the frontal portion. Such movement is particularly advantageous where the closure is rotated between its aforesaid positions and may be utilized to retract the closure with respect to the opening in order to insure the necessary clearance between the wall bounding the opening and the closure to accommodate rotary movement of the latter.

It is therefore a further object of the invention to provide means for moving the closure between its masking and unmasking positions which will also insure the foregoing initial movement of the closure from its masking position.

Another object of the invention is to provide a closure as aforesaid having support means therefor rotatable about an axis, the support means being operable during a portion of its rotative movement to move the closure in a direction transversely of the axis of the support means and to swing the closure in a direction about the latter axis during another portion of its rotative movement. More particularly, it is an object of the invention to provide a support means including an operating torque member about which the closure fulcrums during a position of the movement thereof between its masking and unmasking positions.

Another object of the invention is the provision of means for operating a pair of closure members of the foregoing type in unison, the operating means being adjustable to compensate for irregularities occurring in manufacture or assembly.

A still further object of the invention is the provision of means for adjusting the closure with respect to its associated opening whereby the frontal surface of the closure can be maintained in substantially flush relationship with respect to the surface of the vehicle adjacent the opening when the closure is disposed in its masking position by the support means thereof.

Other objects and advantages of the invention will be more apparent from the following description taken in connection with the accompanying drawings, in which:

Fig. 1 is a front elevational view of a motor vehicle embodying the invention.

Fig. 2 is a top plan view particularly showing the Fig. 1 arrangement of headlamp, the masking member therefor and the operating mechanism for the latter, parts being broken away and in section.

Fig. 3 is a side elevational view, partly in section, taken along the line 3—3 of Fig. 2.

Fig. 4 is a transverse sectional view taken on the line 4—4 of Fig. 3.

Figure 5:
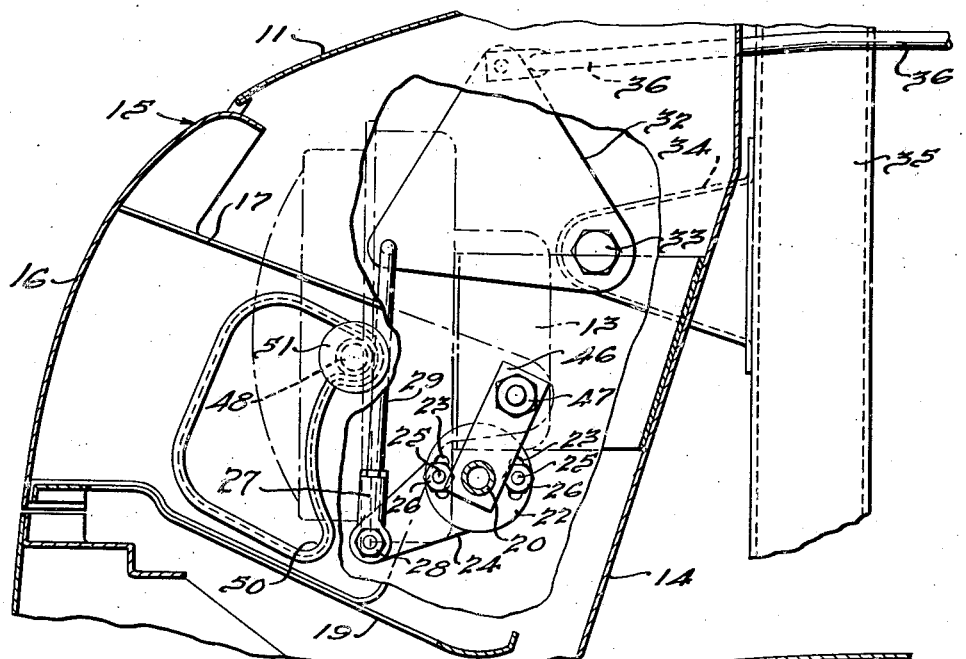
Fig. 5 is an enlarged side elevational view, partly in section, taken as indicated by the line 5—5 of Fig. 1.

The invention is illustrated and described in connection with a motor vehicle generally designated by the numeral 10, including a pair of laterally spaced fenders 11 each of which has a frontal surface provided with an opening 12 therein, one of which is more particularly shown in Figs. 5 and 6. It will be understood, of course, that the openings 12 may be formed in surface portions of the parts of the vehicle, if desired. Disposed rearwardly of each opening 12 is an electric headlamp 13 suitably secured to a housing 14 carried by each of the fenders 11. Each opening 12 is provided with a closure indicated at 15, having a frontal surface part 16 adapted, when the closure is positioned to mask the lamp with respect to associated opening 12 and to substantially complete the frontal surface of the fender. Each closure is provided with a rearwardly extending support part 17 including laterally spaced side members 18. The lower edge of each side member 18 is provided with a strip 19 which serves to mask a portion of the space between the lamp and associated side member when the closure is positioned as shown in Fig. 6.

Figures 6, 7:
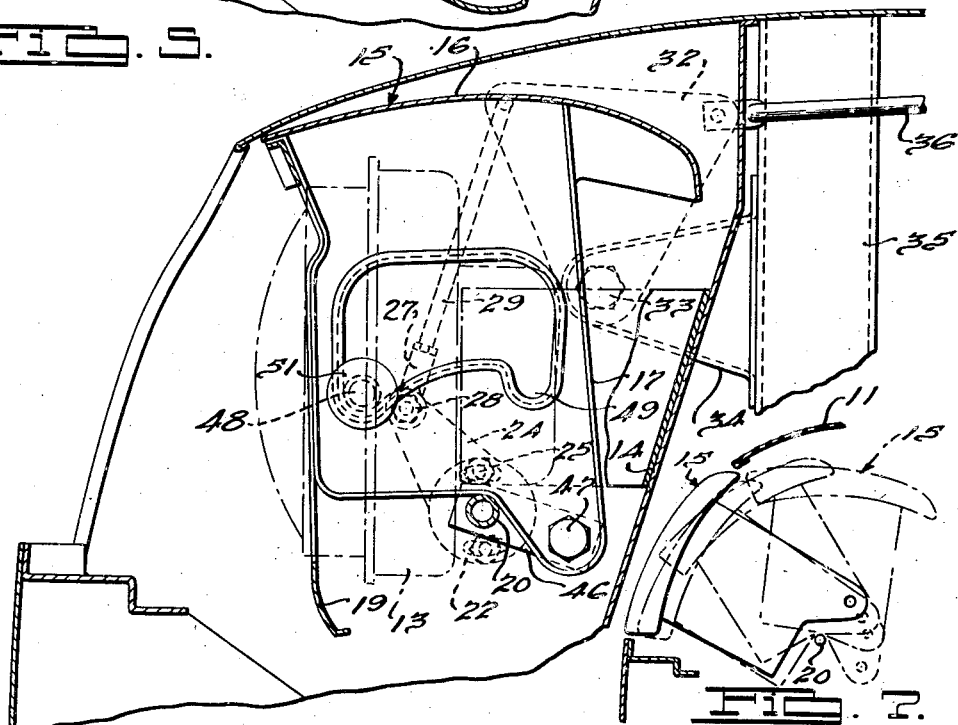
Fig. 6 is a view similar to Fig. 5 but showing certain of the parts in another position.
Fig. 7 is a sectional elevational view diagrammatically illustrating the progressive movement of a closure from a closed to an open position.

The closures 15 are adapted to be moved in unison to mask and unmask the lamps with respect to their associated openings, the masking and unmasking positions being shown in Figs. 5 and 6 respectively. A tubular torque member 20, comprising a plurality of sections articulated at 21, extends between and is supported for rotative movement by the housings 14. A disc 22 having a pair of spaced circumferentially extending slots 23 is non-rotatably carried by the torque member 20, and a crank arm 24 is non-rotatably secured to each disc 22 by bolts 25 each of which extends through a slot 23 and receives a nut member 26. In this manner the arm can be rotatably adjusted with respect to the torque member 20.

The crank arm 24 has a clevis 27 secured thereto by a nut 28, the clevis 27 having an opening therein receiving an operating rod 29.

The upper end of the rod 29 is articulated with one of the effective arms of a bell crank member 32 having its fulcrum pivotally attached by a pin 33 to a bracket 34 carried by an upright member 35 which is supported from the adjacent fender 11. The other effective arm of the bell crank member 32 has connected thereto an actuating member 36 terminating at the body instrument panel 37 and supported at an intermediate point by the body dash 38. The member 36 is slidable axially in a stationary conduit 39 and is provided with a handle 40. The conduit 39 has spaced notches therein for selectively receiving a latch member 41 carried by the hollow member 36, the latch member 41 being actuated by a rod 42 having an end portion thereof projecting through the handle 40.

A switch, generally indicated by the numeral 43, is carried by the conduit 39 and is included in the electrical circuit (not shown) for the headlamps 13. The switch 43 includes an operating pin 44 which is engaged by an abutment 45 carried by the member 36 when the latter is moved to the right as viewed in Fig. 3 to close the switch with respect to the headlamp energizing electrical circuit, the pin 44 being suitably biased to open the switch when the parts are positioned as illustrated in Fig. 3.

Each closure 15 is operably connected to the tubular torque member 20 by a pair of spaced arms, one of which is shown at 46, non-rotatably secured to the member 20 and articulated with a respective side member 18 of the support part 17 by the bolt and nut assembly shown at 47.

It will be apparent from the foregoing description that movement of the operating member 36 to the right as viewed in Figs. 3 and 5 will move the various parts to the respective positions shown in Fig. 6, whereupon the closures 15 are disposed in open or unmasking position and the switch 43 is caused to close the headlamp energizing circuit. As the torque member 20 is rotated in a clockwise direction each closure is moved rearwardly with respect to the opening and substantially transversely with respect to the axis of rotation of the member 20. This movement is sufficient to break any seal which may have been formed by ice, for example, between the closure and its associated fender and provides ample clearance between closure and fender to accommodate swinging of the former to its unmasking or open position. This movement engages the rear portion of each closure part 17 with the member 20 and the latter forms a fulcrum about which the closures swing to their unmasked or open position. It will be noted in Fig. 5 that the closure 15 has clearance with the member 20 to accommodate the initial retracting movement thereof.

Each closure 15 has associated therewith guiding and adjusting means including a track formed by cutting away a portion of each wall 18 of the closure support part 17 and a cooperating track member 48 carried by an adjacent wall of the housing 14. The showing in Figs. 4, 5 and 6 is typical of the arrangement for each closure wall 18 and the wall of the housing 14. The track includes an intended portion 49 in which the member 48 is disposed when the closure is in masking position as shown in Fig. 5. Opposed walls of the portion 49 prevent movement of the closure transversely with respect to its initial retracting movement but accommodate the latter movement, it being understood that when the closure engages the member 20 as aforesaid the track portion 49 is positioned rearwardly of the member 48 and the latter enters a second indented track portion 50 when the closure is in unmasking or open position, as shown in Fig. 6.

The member 48 is provided with an eccentric part 51 which cooperates with the track as aforesaid and which is adjustable relative thereto by rotative adjustment of the member 48. It will be apparent that rotation of the member 48 will vary the position of the eccentric part with respect to that portion of the wall opposite the open side of the indented portion of the track and the position of the frontal surface of the closure can be varied with respect to the fender when the closure is in its closed or masking position thus maintaining the fender and closure surfaces substantially flush.

Although but one embodiment of the invention is herein shown and described, it will be understood that various changes in the size, shape and arrangement of parts may be made without departing from the spirit of our invention and it is not our intention to limit said invention other than by the terms of the appended claims.

We claim:

1. In a motor vehicle having a frontal surface provided with laterally spaced openings, a lamp disposed rearwardly of each opening, a closure member for each of said openings having a frontal surface movable between the latter and the associated lamp to opened and closed positions respectively and having a support portion, a rotatable cross member extending between said closure members and spaced from said support portions when said closure members are in closed position, and arms rotatable with said cross member secured to said support portions respectively, and operable in response to initial rotative movement of said cross member in one direction to retract said closure members from their respective openings and engage said support portions with said cross member, said closure member fulcruming about said cross member in response to further rotative movement of the latter in said one direction to rotate said closure members between their respective openings and associated lamp to said open position.

2. In a motor vehicle having a frontal surface provided with laterally spaced openings, a lamp disposed rearwardly of each opening, a closure member for each of said openings having a frontal surface movable between the latter and the associated lamp to opened and closed positions respectively and having a support portion, a rotatable cross member extending between said closure members and spaced from said support portions when said closure members are in closed position, arms rotatable with said cross member secured to said support portions respectively, and operable in response to initial rotative movement of said cross member in one direction to retract said closure members from their respective openings and engage said support portions with said cross member, said closure member fulcruming about said cross member in response to further rotative movement of the latter in said one direction to rotate said closure members between their respective openings and associated lamp to said open position, and means for guiding each of said closure members including a cam track carried by the support portion of the latter and a cooperating normally fixed member, each of said tracks having spaced indented portions receiving the associated fixed member when said closure members are in said positions respectively.

3. In a motor vehicle having a frontal surface provided with laterally spaced openings, a lamp disposed rearwardly of each opening, a closure member for each of said openings having a frontal surface movable between the latter and the associated lamp to opened and closed positions respectively and having a support portion, a rotatable cross member extending between said closure members and spaced from said support portions when said closure members are in closed position, arms rotatable with said cross member secured to said support portions respectively, and operable in response to initial rotative movement of said cross member in one direction to retract said closure members from their respective openings and engage said support portions with said cross member, said closure member fulcruming about said cross member in response to further rotative movement of the latter in said one direction to rotate said closure members between their respective openings and associated lamp to said open position, and means for guiding each of said closure members including a cam track carried by the support portion of the latter and a cooperating normally fixed member, each of said tracks having spaced indented portions receiving the associated fixed member when said closure members are in said positions respectively, each of said fixed members comprising a rotatably adjustable eccentric portion cooperating with the cam track therefor for adjusting the associated closure with respect to its opening.

4. In a motor vehicle having a frontal surface provided with laterally spaced openings, a lamp disposed rearwardly of each opening, a closure member for each of said openings movable between the latter and the associated lamp to opened and closed positions respectively, each of said closure members including a frontal surface and a rearwardly extending support, guide means for each of said closure members including a track movable with each of said supports and a cooperating normally fixed part, each of said tracks comprising an indented portion receiving the associated fixed part when said closure members are in closed position to thereby restrain the latter against rotative movement between the associated opening and lamp while accommodating retraction of the closure members with respect to the said frontal surface openings, a rotatable cross member extending between said closure members spaced from the supports thereof when said closure members are in closed position, and means operatively connecting each of said supports with said cross member and operable in response to initial rotative movement of said cross member to retract said closure members with respect to said openings and thereby engage said supports with said cross member and so position said track indented portions with respect to the associated fixed parts as to accommodate said swinging movement of said closure members, said closure members fulcruming about said cross member to effect said swinging movement in response to rotative movement of said cross member when the latter and said supports are engaged as aforesaid.

5. In a motor vehicle having a frontal surface provided with laterally spaced openings, a lamp disposed rearwardly of each opening, a closure member for each of said openings movable between the latter and the associated lamp to opened and closed positions respectively, each of said closure members including a frontal surface and a rearwardly extending support, guide means for each of said closure members including a track movable with each of said supports and a cooperating normally fixed part, each of said tracks comprising an indented portion receiving the associated fixed part when said closure members are in closed position to thereby restrain the latter against rotative movement between the associated opening and lamp while accommodating retraction of the closure members with respect to the said frontal surface openings, a rotatable cross member extending between said closure members spaced from the supports thereof when said closure members are in closed position, and means operatively connecting each of said supports with said cross member and operable in response to initial rotative movement of said cross member to retract said closure members with respect to said openings and thereby engage said supports with said cross member and so position said track indented portions with respect to the associated fixed parts as to accommodate said swinging movement of said closure members, said closure members fulcruming about said cross member to effect said swinging movement in response to rotative movement of said cross member when the latter and said supports are engaged as aforesaid, each of said normally fixed parts being adjustable relative to its associated track to thereby vary the position of the associated closure member frontal surface with respect to its opening.

6. In a motor vehicle having a frontal surface provided with laterally spaced openings, a lamp disposed rearwardly of each opening, a closure member for each of said openings movable between the latter and the associated lamp to opened and closed positions respectively, each of said closure members including a frontal surface and a rearwardly extending support, guide means for each of said closure members including a track movable with each of said supports and a cooperating normally fixed part, each of said tracks comprising an indented portion receiving the associated fixed part when said closure members are in closed position to thereby restrain the latter against rotative movement between the associated opening and lamp while accommodating retraction of the closure members with respect to the said frontal surface openings, a rotatable cross member extending between said closure members spaced from the supports thereof when said closure members are in closed position, and means operatively connecting each of said supports with said cross member and operable in response to initial rotative movement of said cross member to retract said closure members with respect to said openings and thereby engage said supports with said cross member and so position said track indented portions with respect to the associated fixed parts as to accommodate said swinging movement of said closure members, said closure members fulcruming about said cross member to effect said swinging movement in response to rotative movement of said cross member when the latter and said supports are engaged as aforesaid, and vehicle driver operated means operable to effect rotative movement of said cross member.

7. In a motor vehicle having a frontal portion provided with an opening therein, a lamp disposed rearwardly of the opening, a closure movable between the lamp and opening to mask and unmask the lamp with respect to the opening and adapted when in its masked position to substantially complete the surface of said frontal portion and adapted when in its unmasked position to accommodate the passage of light from the lamp through the opening, said closure being adapted to be retracted with respect to the opening prior to movement thereof to its unmasking position, and support and operating means including a member rotatable about a fixed axis extending transversely of the vehicle for moving said closure to its said positions, an arm nonrotatably carried by said member and secured to said closure operable upon initial rotation of said member to move said closure in a direction generally transversely of said axis for retracting the closure with respect to the opening and to swing said closure when so retracted about said axis to its unmasking position in response to subsequent rotation of said member.

CARL BREER.
PAUL C. ACKERMAN.